United States Patent
Becoulet et al.

(10) Patent No.: US 12,085,015 B2
(45) Date of Patent: Sep. 10, 2024

(54) ASSEMBLY FOR RETAINING A GEAR TRAIN IN A TURBOMACHINE

(71) Applicant: SAFRAN AIRCRAFT ENGINES, Paris (FR)

(72) Inventors: Julien Patrick Becoulet, Moissy-Cramayel (FR); Olivier Formica, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 239 days.

(21) Appl. No.: 17/626,112

(22) PCT Filed: Jul. 8, 2020

(86) PCT No.: PCT/FR2020/051222
§ 371 (c)(1),
(2) Date: Jan. 11, 2022

(87) PCT Pub. No.: WO2021/005306
PCT Pub. Date: Jan. 14, 2021

(65) Prior Publication Data
US 2023/0003169 A1    Jan. 5, 2023

(30) Foreign Application Priority Data
Jul. 8, 2019 (FR) ...................................... 1907641

(51) Int. Cl.
*F02C 3/107*     (2006.01)
*F02C 7/28*      (2006.01)
*F02K 3/06*      (2006.01)

(52) U.S. Cl.
CPC ................ *F02C 3/107* (2013.01); *F02K 3/06* (2013.01); *F02C 7/28* (2013.01); *F05D 2260/40311* (2013.01); *F05D 2260/96* (2013.01)

(58) Field of Classification Search
CPC .... F02C 3/107; F02C 7/28; F02C 7/36; F02K 3/06; F05D 2260/40311; F05D 2260/96; F16D 1/101; F16H 2001/2872
See application file for complete search history.

(56) References Cited

U.S. PATENT DOCUMENTS 6,964,155 B2 * 11/2005 McCune ............... F16C 23/041
                                                      475/331
8,900,090 B2 * 12/2014 Sheridan ............. F16H 57/0479
                                                      184/6.12

(Continued)

FOREIGN PATENT DOCUMENTS

EP         1183444 B1 *  3/2005  ............ F01D 11/006

OTHER PUBLICATIONS

Machine translation of EP 1183444 B1 obtained on Nov. 28, 2023.*

(Continued)

*Primary Examiner* — Adam D Rogers
(74) *Attorney, Agent, or Firm* — Cozen O'Connor

(57) ABSTRACT

An assembly for retaining a gear train in a turbomachine, the assembly comprising an annular casing (44) in which is engaged an annular part (48) rotatably locked in the casing (44) by annular means of cogging comprising first annular means of coupling formed on the annular part and co-operating with second annular means of coupling formed on the annular casing (44), wherein a film of oil is formed in an annular space bounded between the first means of coupling and the second means of coupling.

18 Claims, 3 Drawing Sheets

(56) References Cited

U.S. PATENT DOCUMENTS

| | | | | |
|---|---|---|---|---|
| 9,127,568 | B2* | 9/2015 | Wilson | F01D 25/26 |
| 9,909,438 | B2* | 3/2018 | Duffy | F01D 11/003 |
| 9,920,654 | B2* | 3/2018 | Dubois | B64D 27/00 |
| 10,087,848 | B2* | 10/2018 | Cigal | F16H 57/025 |
| 10,634,237 | B2* | 4/2020 | Sheridan | F16H 57/082 |
| 11,041,562 | B2* | 6/2021 | Lemoine | F16H 57/043 |
| 11,661,970 | B2* | 5/2023 | Negri | F01D 5/026 |
| | | | | 403/359.1 |
| 2017/0122426 | A1 | 5/2017 | Miller et al. | |
| 2017/0198596 | A1* | 7/2017 | Granberg | F01D 25/12 |
| 2018/0051701 | A1 | 2/2018 | Kupiszewski et al. | |

OTHER PUBLICATIONS

International Patent Application No. PCT/FR2020/051222, International Search Report and Written Opinion dated Nov. 5, 2020, 8 pgs.

* cited by examiner

ASSEMBLY FOR RETAINING A GEAR TRAIN IN A TURBOMACHINE

CROSS-REFERENCE TO RELATED APPLICATIONS

This application is a 35 U.S.C. § 371 filing of International Application No. PCT/FR2020/051222 filed Jul. 8, 2020, which claims the benefit of priority to French Patent Application No. 1907641 filed Jul. 8, 2019, each of which is incorporated herein by reference in its entirety.

TECHNICAL FIELD

The present invention relates to devices for holding a gear train in a turbomachine.

BACKGROUND

Typically, a gear train comprises planet gears meshing with an outer crown or with an outer planetary gear and a centre gear or inner planetary gear. The planet gears are carried by a satellite carrier and mounted freely rotatably on pivots. Such a gear train can be used, for example, to transmit power from a drive shaft, such as the shaft of a low-pressure compressor, to a fan wheel via a centre gear carried by the shaft. In a possible operating configuration, the satellite carrier is fixed in rotation and the centre gear and outer crown are driving and driven, respectively. This assembly is commonly known as planetary reduction gear. With such an arrangement it is possible, for example, in a turbomachine to drive the fan wheel connected to the ring gear via the shaft of the low-pressure compressor.

However, the integration of a reduction gear into a turbomachine poses several difficulties. Firstly, the connection of the reduction gear, i.e. the satellite carrier, to the casing must be made with a certain degree of flexibility in order to limit parasitic mechanical stresses within the reduction gear, i.e. to limit premature deterioration of the teeth, and also to filter out any vibrations propagating in the transmission chain for example. Secondly, it must be possible for a high torque to be taken up by the casing under normal conditions, but also under extreme operating conditions. The two above-mentioned points are thus clearly contradictory and are therefore generally a compromise in the reduction-gear mounting architecture. However, these two functions make it possible to ensure both optimum behaviour of the reduction gear and satisfactory mechanical strength of the connection between the reduction gear and the casing. Thirdly, it is necessary that the architecture selected allows good accessibility for mounting and maintenance of the reduction gear in its environment.

It should be noted that the difficulties outlined above are the same when the outer crown is fixed and the satellite carrier is rotating (planetary gear).

The invention set out below offers a solution that solves the above-mentioned problems while being simple and economical to implement.

SUMMARY

The present document relates to an assembly for retaining a gear train in a turbomachine, the assembly comprising an annular casing in which is engaged an annular part rotatably locked in the casing by annular means of cogging comprising first annular means of coupling formed on the annular part and co-operating with second annular means of coupling formed on the annular casing, wherein a film of oil is formed in an annular space bounded between the first means of coupling and the second means of coupling.

By incorporating an oil film directly into the means of cogging, the annular part of the casing, the movements of the annular part relative to the casing are dampened. Thus, when the annular part is integral with a satellite carrier or an outer planetary gear of a gear train, it is possible to limit the transmission of vibrations to the casing and the rest of the turbomachine.

More specifically, the integration of an oil film between the first means of coupling and the second means of coupling allows to achieve:
- translational damping along a radial direction of the annular part relative to the casing,
- torsional damping about the longitudinal axis, i.e. the axis of the assembly and of the turbomachine,
- tilting damping about an axis perpendicular to a radial direction and to the longitudinal axis.

The annular part may include an annular area of flexibility to give the part greater flexibility in a given area than the rest of the annular part. This annular area of flexibility allows for greater orbiting of the annular part in the casing and thus increases the damping efficiency of the oil film.

The integration of an oil film should not influence the nominal torque transmitted by the annular part to the crankcase, but helps to reduce the oscillations, i.e. the variations of the said torque, which can be of the order of 10 to 15% of the nominal torque.

The first means of coupling and the second means of coupling are for example arranged axially between a first annular seal and a second annular seal each clamped between the annular part and the casing.

To provide an oil supply to said annular space, one of the annular part and the casing can comprise an oil-inlet channel.

The first means of coupling can comprise first teeth circumferentially interposed between second teeth of the second means of coupling.

Each first tooth may comprise radial circumferential end faces and circumferentially facing radial circumferential end faces of each second tooth. These circumferential end faces provide the aforementioned torsional damping.

Each first tooth can comprise a radially outer end face arranged radially opposite a face of the casing. Each second tooth can comprise a radially inner end face arranged radially opposite a face of the annular part. These circumferential end faces provide the aforementioned translation damping.

Each first tooth can comprise an axial end face arranged axially opposite a face of the housing. Each second tooth can comprise an axial end face arranged axially opposite a face of the annular part. These circumferential end faces provide the aforementioned tilting damping.

The said first teeth may extend axially from a first radial annular wall of the annular part which is arranged axially opposite the free axial ends of said second teeth, said second teeth extending axially from a second radial annular wall of the housing which is arranged axially opposite the free ends of the first teeth.

The first annular seal may be radially interposed between the radially outer end of the first annular wall and a radially facing cylindrical surface of the housing. The cylindrical surface can allow the centring of the annular part in the housing when the annular part is mounted in the housing.

Also, the second annular seal can be radially interposed between the radially inner end of the second annular wall and a radially facing cylindrical surface of the annular part.

The cylindrical surface of the casing can have a radius which is greater than the radius of the cylindrical surface of the annular part. Each first tooth can extend radially outward from the cylindrical surface of the annular part and have a radially outer end face arranged to radially face the cylindrical surface of the casing. Each second tooth can extend radially inwards from the cylindrical surface of the casing and have a radially inner end face arranged to radially face the cylindrical surface of the annular part.

In this arrangement, the first ring seal is placed at a greater radial distance than the second seal.

The oil can be lodged circumferentially and continuously between the first and second teeth. For this purpose:
- clearances are provided in the circumferential direction, between the first teeth and the second teeth, and
- clearances are also provided radially between the first teeth and the casing and between the second teeth and the annular part.

Also, the oil can lodge itself between the axial ends of the first teeth and the second radial annular wall and between the axial ends of the second teeth and the first radial annular wall.

The document also relates to an ensemble comprising an assembly as described above and a gear train comprising an inner and an outer planetary gear and planet gears meshing with the inner and outer planetary gears and each mounted freely rotatable on a satellite carrier. The annular part can be attached to the outer planetary gear or the satellite carrier.

The invention will be better understood and other details, characteristics and advantages of the invention will appear when reading the following description, which is given as a non-limiting example, with reference to the attached drawings.

DETAILED DESCRIPTION

Figure 1:
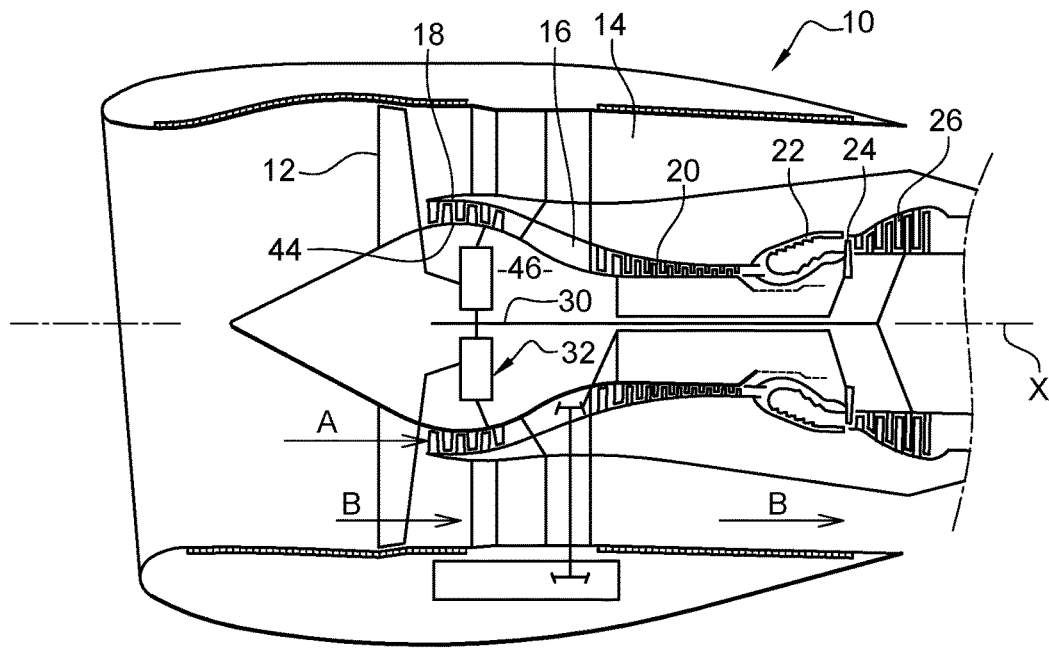
FIG. 1 is a schematic view, in perspective, of a turbomachine according to the known technique.

First of all, reference is made to FIG. 1, which represents a schematic view of a turbomachine 10 according to the known technique comprising, from upstream to downstream, a fan wheel 12, the rotation of which induces an acceleration of air in an annular secondary air stream 14 (air flow B) surrounding successively from upstream to downstream, an annular primary air stream 16 (air flow A) flowing into a low-pressure compressor 18, a high-pressure compressor 20, an annular combustion chamber 22, a high-pressure turbine 24 and a low-pressure turbine 26. Classically, the low-pressure turbine 26 rotates the rotor 30 of the low-pressure compressor, which is connected to the fan wheel 12. However, in order to limit the rotational speed of the fan wheel 12 relative to the rotational speed of the rotor 30 of the low-pressure compressor 18, it is known to mount a reduction gear 32 radially inside the low-pressure compressor 18 to reduce the output speed.

Figure 2:
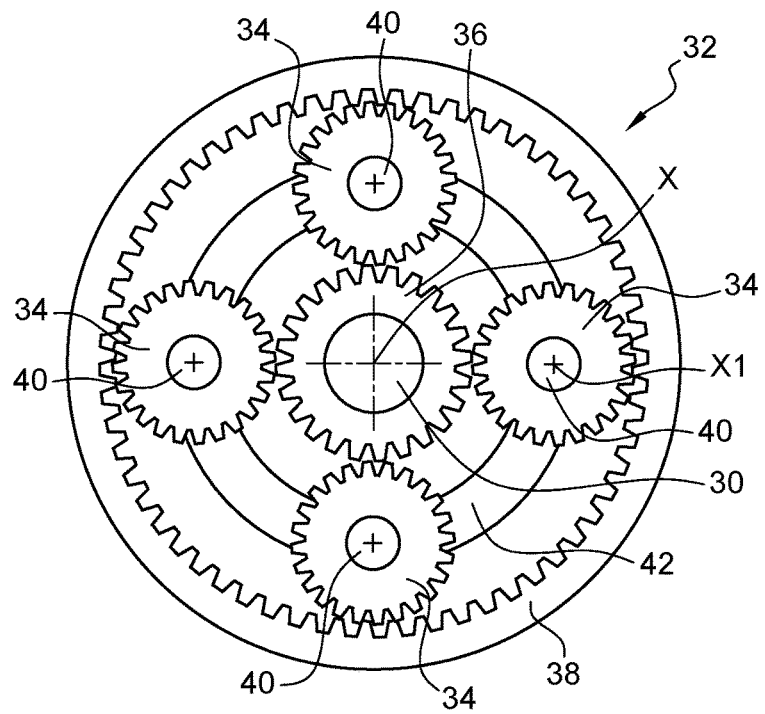
FIG. 2 is a cross-sectional schematic view of an epicyclic gear train intended to be used in a turbomachine according to FIG. 1.

As illustrated in FIG. 2, such a gear train 32 comprises planet gears 34 meshing with an inner planetary gear 36 or central gear and an outer planetary gear 38 or outer crown, the inner planetary gear 36 and the outer planetary gear 38 being coaxial with the X axis of the turbomachine. Each planet gear 34 is mounted freely rotatable around a pivot 40 and the pivots 40 are integral with a satellite carrier 42. In a planetary reduction gear, the centre gear 36 is integral in rotation with the shaft 30 of the low-pressure compressor 18, which forms an input of a gear train, the satellite carrier 42 is stationary, and the outer crown 38 is made integral with the fan wheel 12 and forms an output for reducing the speed of the gear train. The casing 44 of the turbomachine externally delimits an annular enclosure 46 in which the gear train is mounted. In an epicyclic reduction gear, the satellite carrier forms an output for reducing the speed of the gear train and is made integral with the fan wheel 12, the outer planetary gear being integral with the casing. In both cases, the satellite carrier when fixed or the outer planetary gear when fixed is connected to the casing by a annular part.

The object of the present invention is to provide a particular embodiment of an assembly for holding a gear train 32 in a turbomachine.

Figure 3:
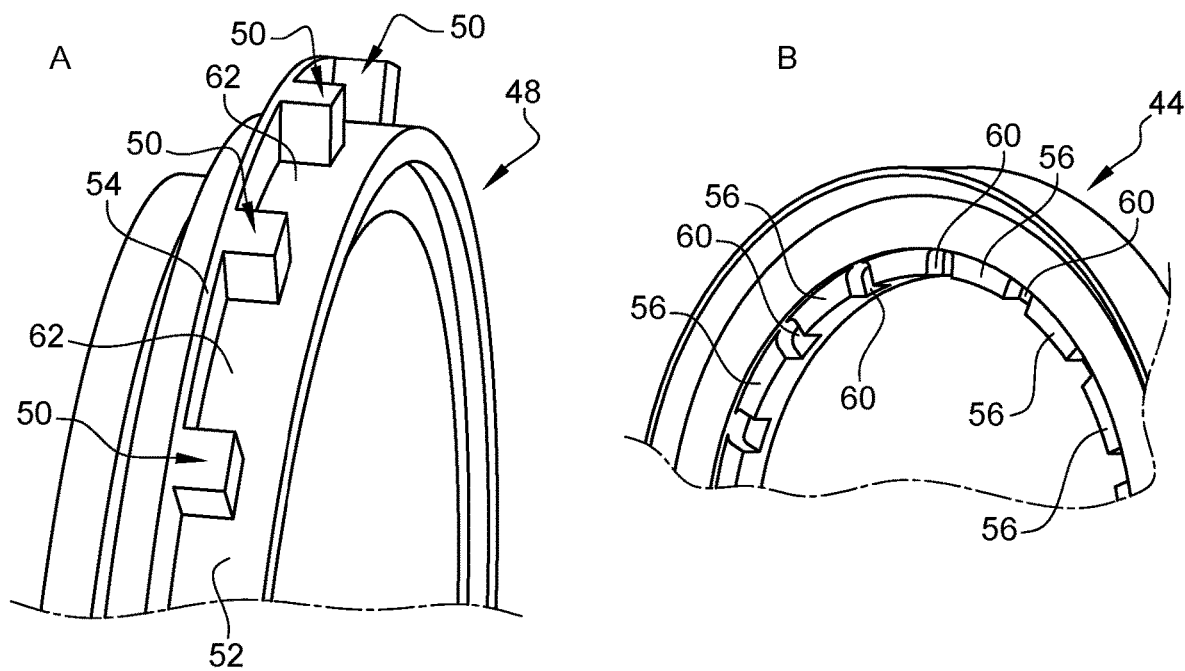
FIG. 3, A-B is a perspective view of an annular part intended to be mounted in a casing, in embodiments.
Figure 4:
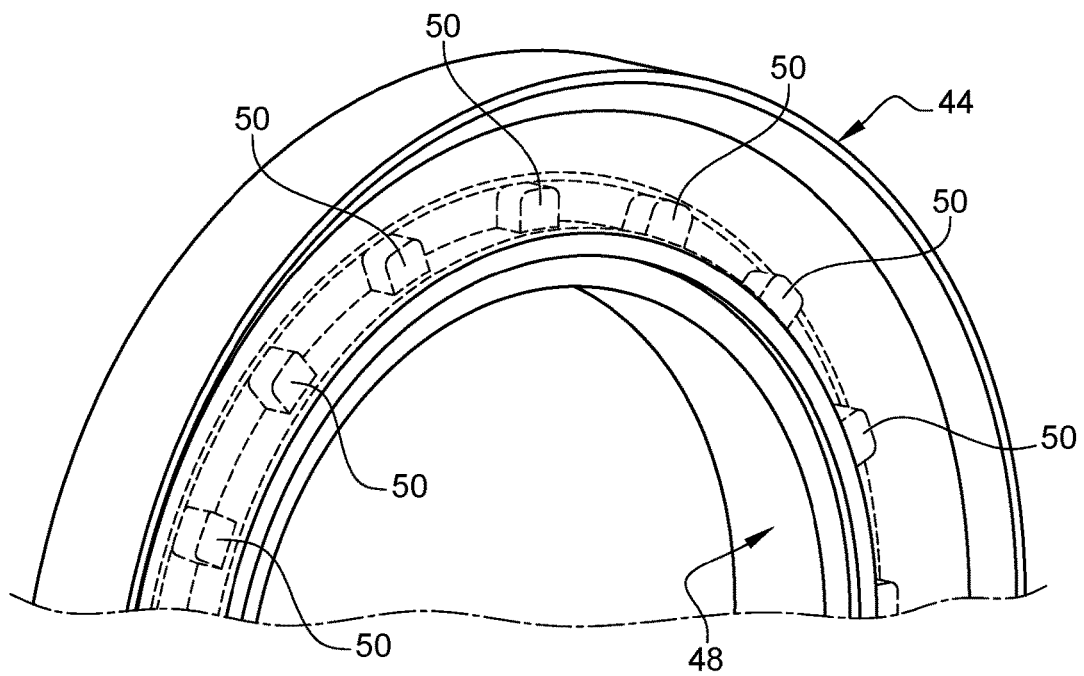
FIG. 4 is a perspective schematic of an assembly of the annular part of FIG. 3A into the casing of FIG. 3B.

FIG. 3 shows a annular part 48 intended for connection to the satellite carrier 42 in a planetary reduction gear assembly or to the outer planetary gear 38 in an epicyclic reduction gear. Only part of the casing 44 is shown in FIG. 3B. As can be seen, the annular part 48 comprises first means of coupling formed by a plurality of first teeth 50 projecting radially outwards from an annular wall and more precisely from a cylindrical surface 52 facing radially outwards (FIG. 3A, FIGS. 5A and 5B). The first teeth 50 extend axially from a first radial annular wall 54 of the annular part 48. Each first tooth 50 has a substantially block-like profile comprising substantially flat faces. The first teeth 50 cooperate with second means of coupling of the casing 44. These second means of coupling comprise second radial teeth 56 evenly spaced circumferentially from each other. The second teeth 56 extend axially from a second radial annular wall 58 and circumferentially define between them recesses 60 for receiving the first teeth 50. Similarly, the first teeth 50 define circumferential recesses 62 between them for receiving the second teeth 56.

When the annular part 48 is mounted in the casing 44, the axial free ends of the first teeth 50 axially face the second radial annular wall 58 of the casing 44 and the axial free ends of the second teeth 56 axially face the first radial annular wall 54 of the casing 44.

Figure 5:
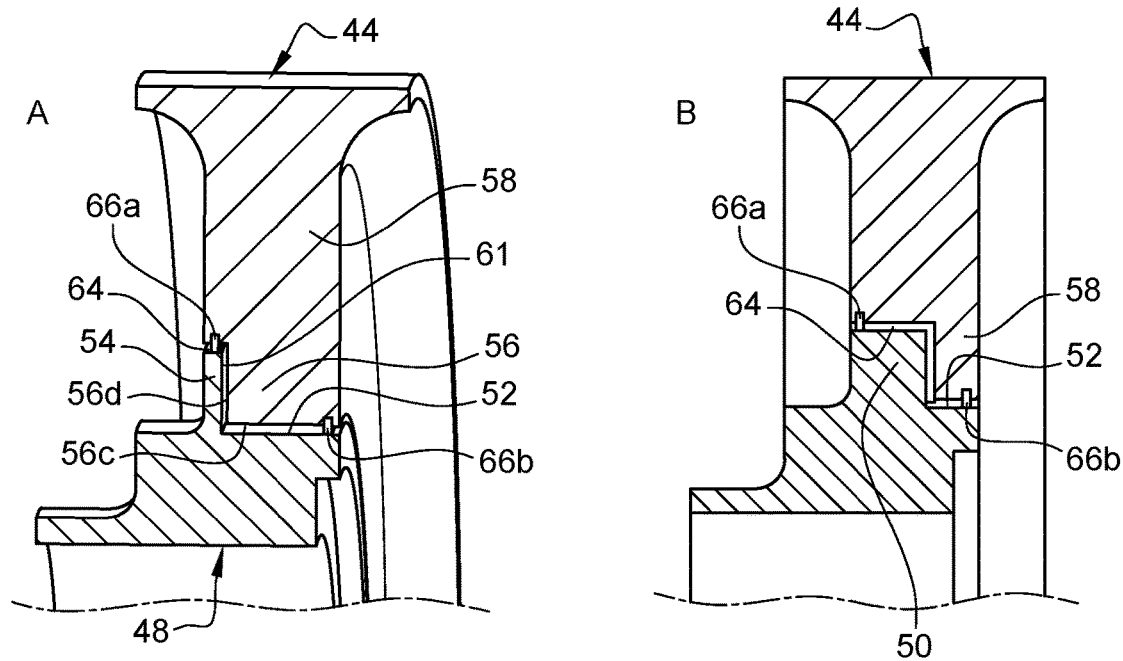
FIG. 5, A-B is a left-hand part, named FIG. 5A representing the assembly of FIG. 4 according to a first cutting plane and a right-hand part, named FIG. 5B, representing the assembly of FIG. 4 according to a second cutting plane circumferentially offset from the first cutting plane.

As can be seen in FIG. 5, the first radial annular wall 54 is mounted in the casing 44 so that its radially outer end is arranged opposite a cylindrical surface 64 of the casing 44. Similarly, the radially inner end of the second radial annular wall 58 is arranged radially opposite the cylindrical surface 52 of the annular part 48.

A first annular seal 66a is radially interposed between the radially outer end of the first radial annular wall 54 and the cylindrical wall of the casing and a second annular seal 66b is radially interposed between the cylindrical face or surface 52 of the annular part 48 and the radially inner end of the second radial annular wall 58.

Figure 6:
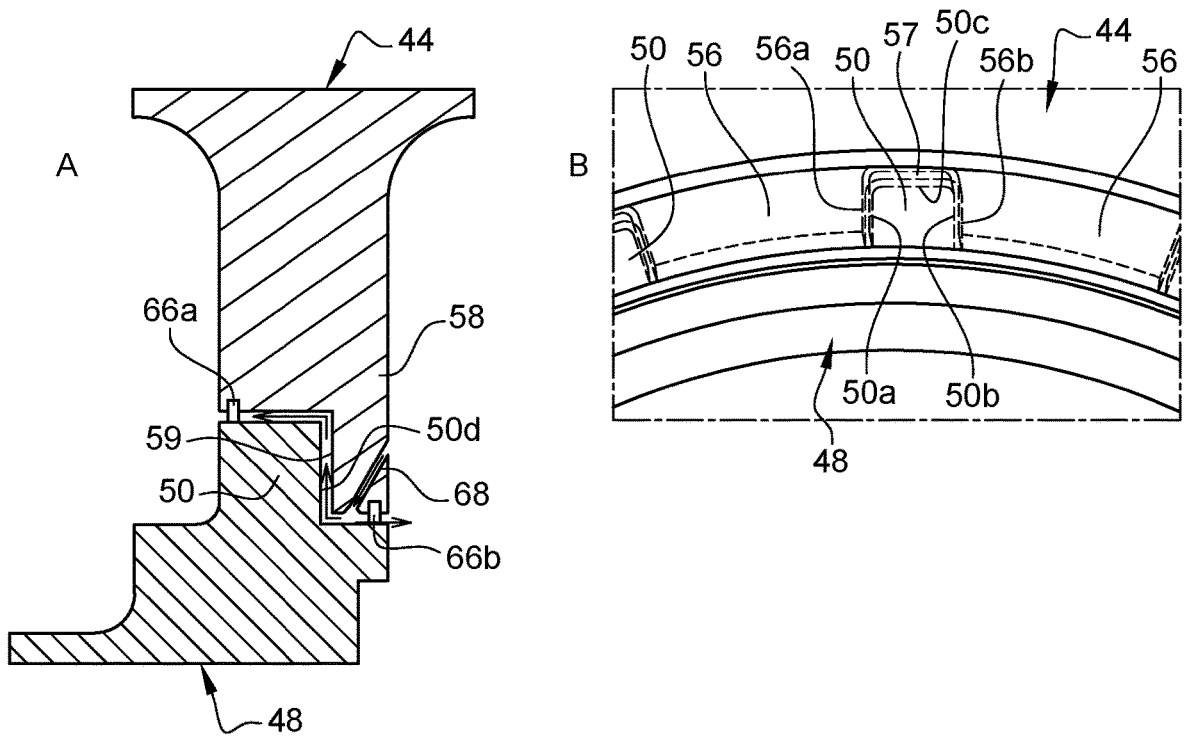
FIG. 6, A-B is a left-hand part, named FIG. 6A, showing the oil introduction between the annular part and the casing, and a right-hand part, named FIG. 6B, showing the clearances between the annular part and the casing in cross-section along a transverse plane.

Each first tooth 50 comprises circumferential end faces 50a, 50b extending radially and circumferentially opposite radially extending circumferential end faces 56a, 56b of each second tooth 56 (FIG. 6B). Each first tooth 50 comprises a radially outer end face 50c arranged radially opposite a face 57 of the casing 44 (FIG. 6B). Each second tooth 56 comprises a radially inner end face 56c arranged opposite the face 52 of the annular part 48 (FIG. 5A). Each first tooth 50 can comprise a radially outer end face 50d arranged radially opposite a face 59 of the casing 44. Each second tooth 56 can comprise an axial end face 56d arranged axially opposite a face 61 of the annular part 44. This face 61 being a downstream face of the radial annular wall 54. As there are several teeth 50, 56, it is understood that there are several faces as mentioned above.

To allow oil to flow through the annular space formed between the first teeth 50 and the second teeth 56, it is necessary to size the annular part 48 and the casing 44 so that:

clearances exist, in the circumferential direction, between the first teeth 50 and the second teeth 56, more specifically between the faces 50a and 56a and between the faces 50b and 56b clearances exist radially between the radially outer faces of the first teeth 50 and the casing 44 and between the radially inner faces of the second teeth 60 and the annular part 48, more specifically between the faces 56c and 52 and between the faces 50c and 57.

Also, oil also lodges itself between the axial ends of the first teeth 50 and the second radial annular wall 58 and between the axial ends of the second teeth 56 and the first radial annular wall 54, more specifically between the faces 56d and 61 and between the faces 50d and 59.

The oil is inserted through a channel 68 formed in the second radial annular wall of the casing, this channel 68 opening between the first annular seal 66a and the second annular seal 66b. It is understood that the oil could also be inserted through a channel 68 formed in the annular part 48.

The use of a film of oil between the first teeth 50 and the second teeth 56 allows for the damping of the movements of the annular part 52 relative to the casing 44. Thus, when the annular part 48 is integral with a satellite carrier 42 or an outer planetary gear 38 of a gear train 32 as illustrated in FIG. 2, it is possible to limit the transmission of vibrations to the casing 44 and the rest of the turbomachine.

The invention claimed is:

1. An assembly for retaining a gear train (32) in a turbomachine, the assembly comprising:
    an annular casing (44); and
    an annular part (48) engaged and rotationally fixed in the annular casing (44) by annular means of cogging comprising:
        first annular means of coupling formed on the annular part; and
        second annular means of coupling formed on the annular casing (44) and cooperating with the first annular means of coupling,
    wherein an oil film is formed in an annular space defined between the first means of coupling and the second means of coupling,
    the first means of coupling and the second means of coupling being axially arranged between a first annular seal (66a) and a second annular seal (66b) each clamped between the annular part (48) and the annular casing (44),
    the first means of coupling comprising first teeth (50) extending radially outwardly and arranged circumferentially in alternation with second teeth (56) of the second means of coupling, the second teeth extending radially inwardly,
    said first teeth (50) extending axially from a first radial annular wall (54) of the annular part (48) which is arranged axially opposite axial free ends of said second teeth (56),
    said second teeth (56) extending axially from a second radial annular wall (58) of the annular casing which is arranged axially opposite axial free ends of the first teeth (50),
    wherein the first annular seal (66a) is radially interposed between a radially outer end of the first annular wall (54) and a radially facing cylindrical surface (64) of the annular casing (44).

2. The assembly according to claim 1, wherein one of the annular part (48) and the annular casing (44) comprises an oil-inlet channel (68) opening into the annular space.

3. The assembly according to claim 1, wherein each first tooth (50) comprises circumferential radial end faces (50a, 50b) and each second tooth (56) comprises circumferentially radial end faces (56a, 56b) opposite the circumferential radial end faces of each first tooth (50).

4. The assembly according to claim 1, wherein each first tooth comprises a radially outer end face (50c) arranged radially opposite a face (57) of the annular casing (44).

5. The assembly according to claim 1, wherein each second tooth (56) comprises a radially inner end face (56c) arranged radially opposite a face (52) of the annular part (48).

6. The assembly according to claim 1, wherein each first tooth comprises an axial end face (50d) arranged axially opposite a face (59) of the annular casing (44).

7. The assembly according to claim 1, wherein each second tooth (56) comprises an axial end face (56d) arranged axially opposite a face (61) of the annular part.

8. The assembly according to claim 1, wherein the second annular seal (66b) is radially interposed between a radially inner end of the second annular wall (58) and a radially facing cylindrical surface (52) of the annular part (48).

9. An ensemble comprising an assembly according to claim 1 and a gear train (32) having an inner planetary gear (36) and an outer planetary gear (38) and planet gears (34) meshing with the inner planetary gear (36) and the outer planetary gear (38), and each mounted for free rotation on a satellite carrier (42).

10. The ensemble according to claim 9, wherein the annular part (48) is attached to the outer planetary gear (38) or to the satellite carrier (42).

11. The ensemble according to claim 9, wherein one of the annular part (48) and the annular casing (44) comprises an oil-inlet channel (68) opening into the annular space.

12. The ensemble according to claim 9, wherein the second annular seal (66b) is radially interposed between a radially inner end of the second annular wall (58) and a radially facing cylindrical surface (52) of the annular part (48).

13. An assembly for retaining a gear train (32) in a turbomachine, the assembly comprising:
    an annular casing (44); and an annular part (48) engaged and rotationally fixed in the annular casing (44) by annular means of cogging comprising:

first annular means of coupling formed on the annular part; and second annular means of coupling formed on the annular casing (44) and cooperating with the first annular means of coupling, wherein an oil film is formed in an annular space defined between the first means of coupling and the second means of coupling, the first means of coupling and the second means of coupling being axially arranged between a first annular seal (66a) and a second annular seal (66b) each clamped between the annular part (48) and the annular casing (44), the first means of coupling comprising first teeth (50) extending radially outwardly and arranged circumferentially in alternation with second teeth (56) of the second means of coupling, the second teeth extending radially inwardly, said first teeth (50) extending axially from a first radial annular wall (54) of the annular part (48) which is arranged axially opposite axial free ends of said second teeth (56), said second teeth (56) extending axially from a second radial annular wall (58) of the annular casing which is arranged axially opposite axial free ends of the first teeth (50), wherein the second annular seal (66b) is radially interposed between a radially inner end of the second annular wall (58) and a radially facing cylindrical surface (52) of the annular part (48).

14. The assembly according to claim 13, wherein one of the annular part (48) and the annular casing (44) comprises an oil-inlet channel (68) opening into the annular space.

15. The assembly according to claim 13, wherein each first tooth (50) comprises circumferential radial end faces (50a, 50b) and each second tooth (56) comprises circumferentially radial end faces (56a, 56b) opposite the circumferential radial end faces of each first tooth (50).

16. The assembly according to claim 13, wherein each first tooth comprises a radially outer end face (50c) arranged radially opposite a face (57) of the annular casing (44).

17. The assembly according to claim 13, wherein each second tooth (56) comprises a radially inner end face (56c) arranged radially opposite a face (52) of the annular part (48).

18. The assembly according to claim 13, wherein each first tooth comprises an axial end face (50d) arranged axially opposite a face (59) of the annular casing (44).

* * * * *